United States Patent [19]

Sonderegger et al.

[11] Patent Number: 5,724,024
[45] Date of Patent: Mar. 3, 1998

[54] DEVICE FOR DETECTING THE PRESENCE OF PERSONS ON SEATS

[75] Inventors: Wilhelm Sonderegger, Dornbirn; Georg Kuehne, Rankwill; Thomas Hupp, Feldkirch, all of Austria

[73] Assignee: Vos Verkehrs-Optimierungs-Systems GmbH & Co., Austria

[21] Appl. No.: 564,366

[22] PCT Filed: Jun. 1, 1994

[86] PCT No.: PCT/EP94/01779

§ 371 Date: Mar. 13, 1996

§ 102(e) Date: Mar. 13, 1996

[87] PCT Pub. No.: WO95/00368

PCT Pub. Date: Jan. 5, 1995

[30] Foreign Application Priority Data

Jun. 22, 1993 [DE] Germany .............. 43 20 513.5
Jul. 3, 1993 [DE] Germany .............. 43 22 159.9

[51] Int. Cl.⁶ ...................................... G08B 13/26
[52] U.S. Cl. .................... 340/562; 128/722; 340/457.1
[58] Field of Search ......................... 340/573, 562, 340/457.1; 128/687, 689, 721, 722; 180/271

[56] References Cited

U.S. PATENT DOCUMENTS

| 3,740,567 | 6/1973 | Atkins | 340/562 X |
| 3,806,867 | 4/1974 | Quantz | 340/457.1 |
| 3,864,668 | 2/1975 | Bickford | 340/457.1 X |
| 4,015,236 | 3/1977 | Boudeville | 340/457.1 |
| 4,474,185 | 10/1984 | Diamond | 128/722 |
| 4,885,566 | 12/1989 | Aoki et al. | 340/457.1 |
| 5,404,128 | 4/1995 | Ogino et al. | 340/425.5 |
| 5,446,391 | 8/1995 | Aoki et al. | 340/562 X |

FOREIGN PATENT DOCUMENTS

| 560351 | 9/1993 | European Pat. Off. . |
| 3635644 | 4/1987 | Germany . |

Primary Examiner—Thomas Mullen
Attorney, Agent, or Firm—Cooper & Dunham LLP

[57] ABSTRACT

A device detects whether persons are present on seats, for example of a vehicle. An electric monitoring arrangement with electrodes is associated to each person. The electrodes are provided for sensing the human body, in particular the thorax. Mainly the breathing is processed in an evaluation circuit.

10 Claims, 9 Drawing Sheets

DEVICE FOR DETECTING THE PRESENCE OF PERSONS ON SEATS

BACKGROUND OF THE INVENTION

The invention relates to a device for detecting the presence of persons on seats, pursuant to the preamble of claim 1.

SUMMARY OF THE INVENTION

Such detecting devices have proven to be very important when there is a question of determining whether or not a seat in a vehicle is occupied. For example, this is necessary in connection with a passenger-side air bag, in order to determine whether or not a person is sitting in the front passenger seat, so as to avoid unnecessary triggering of the passenger-side air bag in case of an accident.

Likewise, it is necessary to determine the number of persons, not only in the front passenger seat, when there is a question of determining a certain vehicle occupation factor. This vehicle occupation factor relates to determining a calculation variable which indicates the distance which the vehicle has traveled with what number of persons. This is because it has turned out that as a rule, passenger cars are occupied only by one or two persons, and that any occupation number above this tends to be the exception.

It is now desirable to increase the occupation factor of passenger cars and for this purpose, it is necessary to first determine the number of persons riding in the motor vehicle, in a manner that is as resistant as possible to falsification.

Another problem consists of the desire to have a very accurate monitoring system to ensure that persons in the car have put on their safety belts. This can be desirable in case of accidents for reasons of insurance law.

Until now, it has only been known to detect the presence of persons by means of ultrasound sensors or infrared sensors, for example. These sensors, however, are not resistant to falsification and furthermore are inaccurate.

The invention is therefore based on the task of further developing a device of the type stated initially, in such a way that it is possible to detect the presence of persons on seats, for example in a motor vehicle, with a high level of security against falsification.

To accomplish the stated task, the invention is characterized by the technical theory of claim 1.

The significant characteristic of the invention is that only the presence of one person, in each instance or seat, is detected by means of one or more electrodes assigned to the person or seat, with a capacitative measurement being carried out on the person's body, using the electrodes. The body of the person to be detected is considered as the dielectric which is arranged between at least two electrodes, as a moving body. Flux lines develop between the electrodes and are modified by the moving body which is located in the flux line progression. This modification of the flux lines, caused by the movement of the person located in the field of action of the electrode, as well as by this person's breathing and/or heart beat (thorax changes), ensures an accurate measurement, which is furthermore resistant to falsification, of the presence of a person who is located between the electrodes.

For the arrangement of the electrodes to the body, there are a number of possibilities, all of which are supposed to be covered by the present invention.

In a first, preferred embodiment, it is provided that a first electrode is attached to the safety belt and rests against the front part of the person's body by being attached to the safety belt, while another electrode is attached to the seatback, forming a capacitor with the aforementioned first electrode.

In this connection, it is essential that the person's breathing is detected by means of changes in rhythm of the upper body, in the flux line progression of the two opposing electrodes.

The rhythmic expansion and contraction of the volume of the upper body resulting from breathing is therefore detected as a breathing signal and is evaluated accordingly. Since the parameters of human breathing are characteristic, this method is particularly secure against falsification, because a dog wearing a safety belt, for example, breathes differently than a human being wearing a safety belt, so that the system cannot be deceived in this way.

Likewise, inanimate objects around which a safety belt has been placed can easily be detected and eliminated from consideration by the evaluation electronics. This is therefore a detection method which is relatively secure against falsification.

In connection with the safety belt lock, the described sensor system can also be used as a monitoring system to determine safety belt use; correct placement of the safety belt at the front of the body can be detected if the signal is evaluated to this effect.

Likewise, such a device can be used as a person sensor for an air bag; this device can function not only for the front seats but also for the rear seats, if, in future, it is provided that air bags are also used for the rear seats.

Instead of the electrode arrangement described here, where a first electrode is preferably arranged in the shoulder belt or the lap belt of the safety belt, and the second electrode is preferably arranged in the back cushion, there are also other possibilities.

For example, it can be provided, instead of the electrode arranged in the back cushion, that the seat frame itself, which generally is made of metal, can be used as an electrode, eliminating the need for an electrode in the back cushion.

Likewise, it can be provided that instead of the arrangement of one or more electrodes arranged in the safety belt, the safety belt itself be structured as an electrode. In this connection, it might be necessary to weave electrically conductive threads into a certain surface of the safety belt, which are connected with the evaluation electronics by means of corresponding signal wires.

Likewise, it is possible that two electrodes separated by one another by a certain distance are arranged in or on the safety belt.

Instead of the arrangement of electrodes in the safety belt, the electrodes can also be arranged on parts of the motor vehicle, such as on the seatback, or in the lumbar region, in order to also use the moving body of the person as a dielectric between two or more capacitor plates, or electrodes.

Instead of a capacity measurement of the upper body, other parts of the human body can also be used for the capacity measurement, such as the abdominal region, lower body and thighs, etc. This means that the electrodes do not necessarily have to be arranged in the seatback and in corresponding lateral regions of the seatback, it is also provided to arrange these electrodes in the seat cushion or at the front edge of the seat cushion, in order to conduct a capacity measurement at the aforementioned body regions of the person, for example.

It is also not necessary to arrange the lateral electrodes on the upper body in the lateral regions of a seat. It is also sufficient to arrange at least two electrodes at a reciprocal distance on the seatback, because a capacity change between the two electrodes arranged next to one another at a distance is also produced by the breathing movements of the upper body.

Likewise, it can also be possible to have the electrodes stressed by pressure caused by the upper body, for example with a first electrode arranged on the back of the seatback and a second electrode arranged on the front of the seatback, next to the person's back. The person's upper body then presses on the electrode in the seatback and moves it in the direction of the electrode arranged behind the seatback, because of the breathing movements, again producing a capacity change between the two electrodes.

It is important for all the arrangements that a breathing which is characteristic for the human body is detected, in order to thereby differentiate between the presence of human beings, animals or inanimate objects.

In the present description, the detection of human breathing was described as the most important parameter. However, the invention is not limited to this. Instead, other physiological parameters can be detected, either alone or in combination with breathing.

These are particularly heartbeat and body motility. A further improvement as security against falsification results from being able to conduct plausibility comparisons between the parameters derived for individual persons in a vehicle.

The area of application of the invention is not limited to detecting the presence of persons on seats in motor vehicles, but furthermore such measurements can also be conducted in other vehicles, such as aircraft, watercraft and rail vehicles, for example. In addition to use in vehicles, there are also applications in stationary rooms, such as meeting halls, bleachers, theaters, office areas and similar areas.

The object of the present invention results not only from the object of the individual claims, but also from the combination of the individual claims among one another. All of the information and characteristics disclosed in the documents, including the abstract, particularly the spatial structure shown in the drawings, are claims as essential to the invention, if they are new, individually or in combination, as compared with the state of the art.

In the following, the invention is explained in greater detail on the basis of drawings which represent only one embodiment path. In this connection, additional characteristics which are essential to the invention, and advantages of the invention, are evident from the drawings and the description of them.

BRIEF DESCRIPTION OF THE DRAWINGS

These show.

DETAILED DESCRIPTION OF THE PREFERRED EMBODIMENTS

Figure 1:
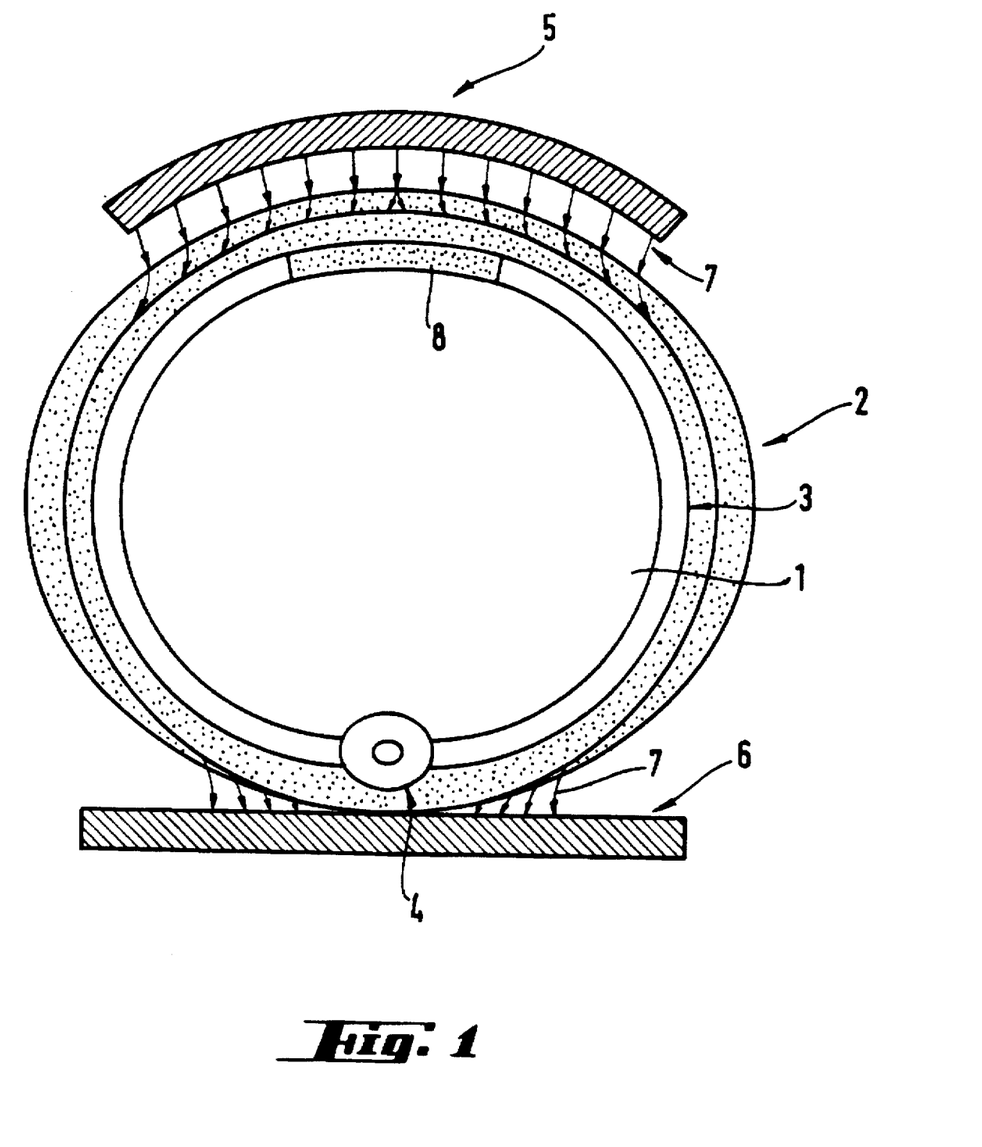
FIG. 1: schematically, a cross-section through a measurement arrangement according to the invention, in a preferred embodiment.

In FIG. 1, an electrode arrangement is shown as a preferred embodiment example, which essentially consists of two electrodes 5, 6, with the electrode 6, for example, preferably being arranged in a back cushion, and the electrode 5 being arranged in a safety belt, for example in the region of the shoulder belt or lap belt.

The human thorax 1 has a certain volume and is delimited by ribs 3, which are surrounded by tissue 2, muscles etc., on the outside. The ribs 3 form a hinge in the region of the spinal column 4, so that the entire thorax moves rhythmically in the flux line field of the flux lines 7 between the electrodes 5, 6, due to the breathing movements.

The capacitative sensor system detects changes in the capacity of the capacitor formed between the front and rear electrode arrangement. This measures changes in the dielectric, in the plate distance, and changes in the paths of the air/tissue flux lines. The measurement arrangement can therefore be represented as a capacitor with different layers.

The volume of the rib cage (thorax) is changed by raising and lowering the ribs.

The following effects are superimposed for the measurement:

1.) The air gap towards the chest electrode (clothing) is somewhat reduced during inhalation.

2.) The belt surface forming one of the electrodes of the capacitor is slightly enlarge during inhalation, since the thorax lifts.

3.) The path of the flux lines through the tissue becomes somewhat longer during inhalation.

Effects 1 and 2 increase the capacity, effect 3 reduces it. Effect 3 is insignificant here, in terms of its influence (approximately 50 times less than effect 1), so that only 1 and 2 are important for the principle of action.

The involvement of the diaphragm in breathing is only recorded in the lower belt region if the shoulder belt detects movement in part of the abdomen. Of course the lap belt only detects movement in this part.

Figure 2:
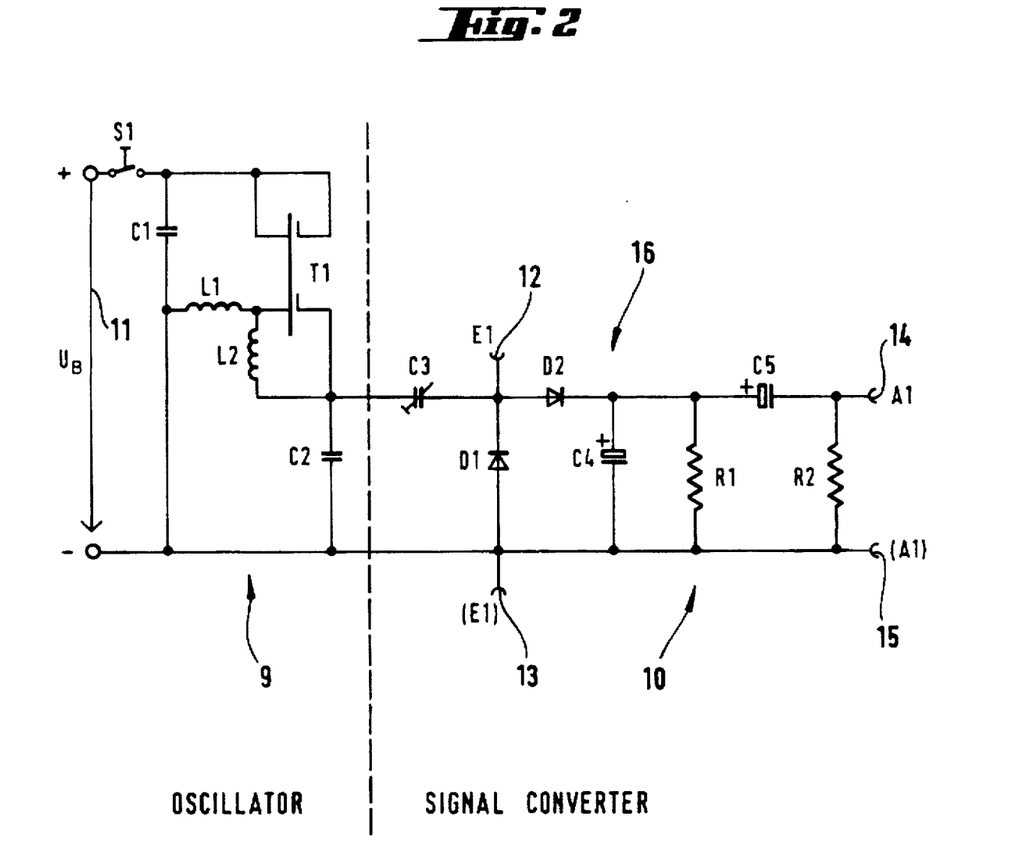
FIG. 2: schematically, a wiring diagram of a capacity measurement.
Figure 3:
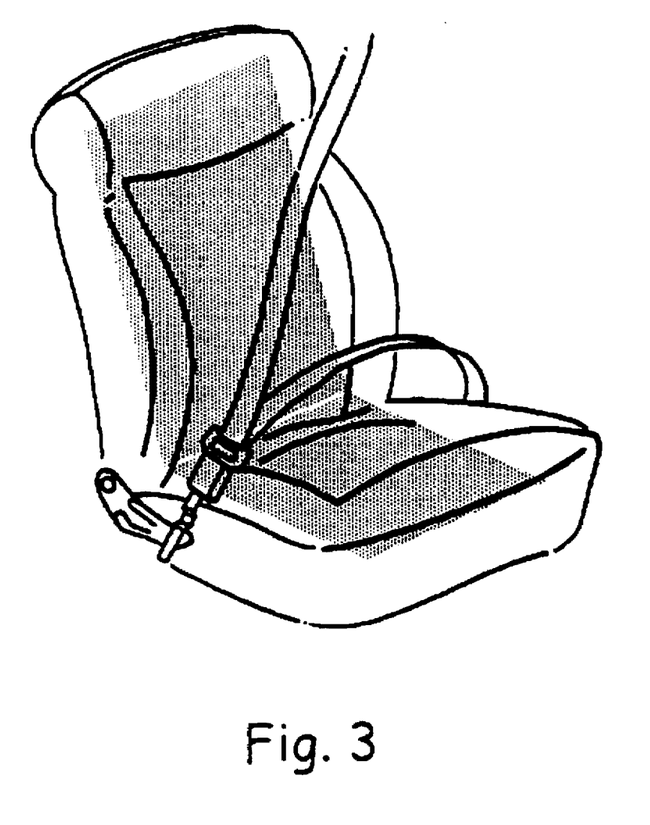
FIG. 3: a perspective view of a metal frame of the seat used as one of two electrodes.
Figures 4A, 4B:
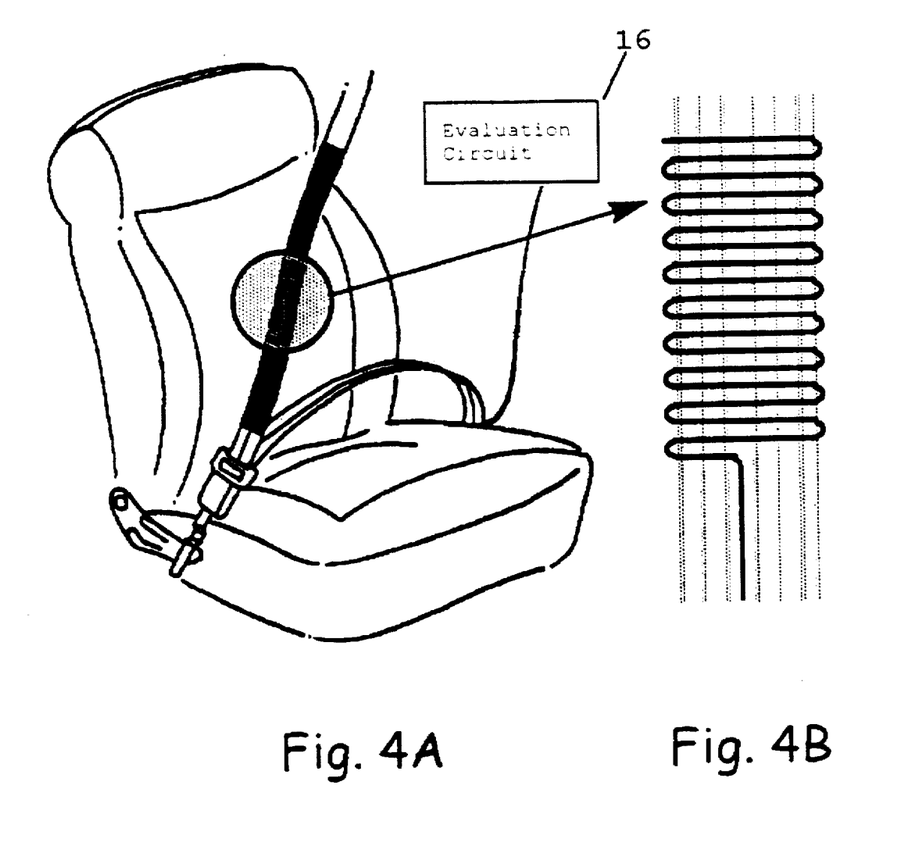
FIG. 4A: a perspective view of a safety belt structure as an electrode wherein the safety belt is electrically connected to an evaluation circuit.
FIG. 4B: a schematic drawing of the safety belt structure as an electrode.
Figure 5:
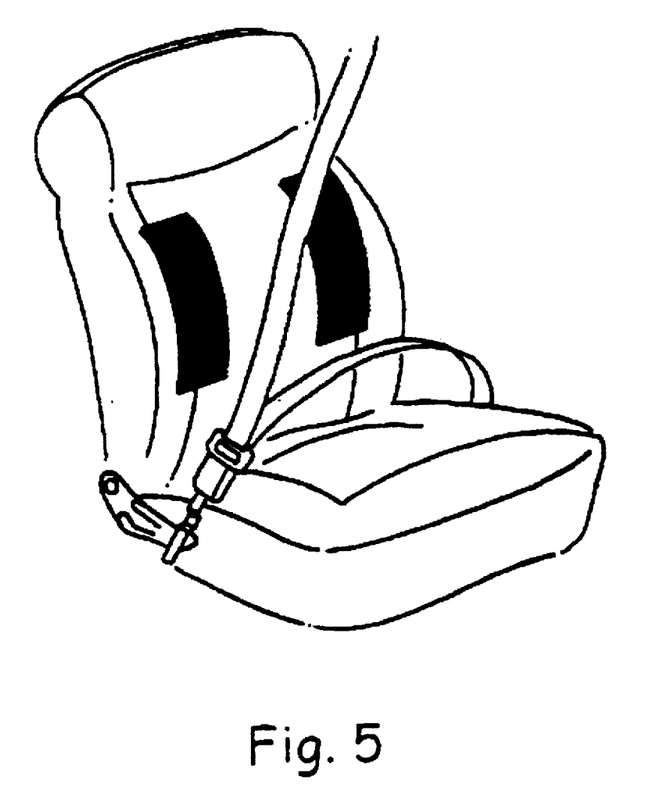
FIG. 5: a perspective view of two electrodes arranged in a seat at the lumbar region of the human body.
Figure 6:
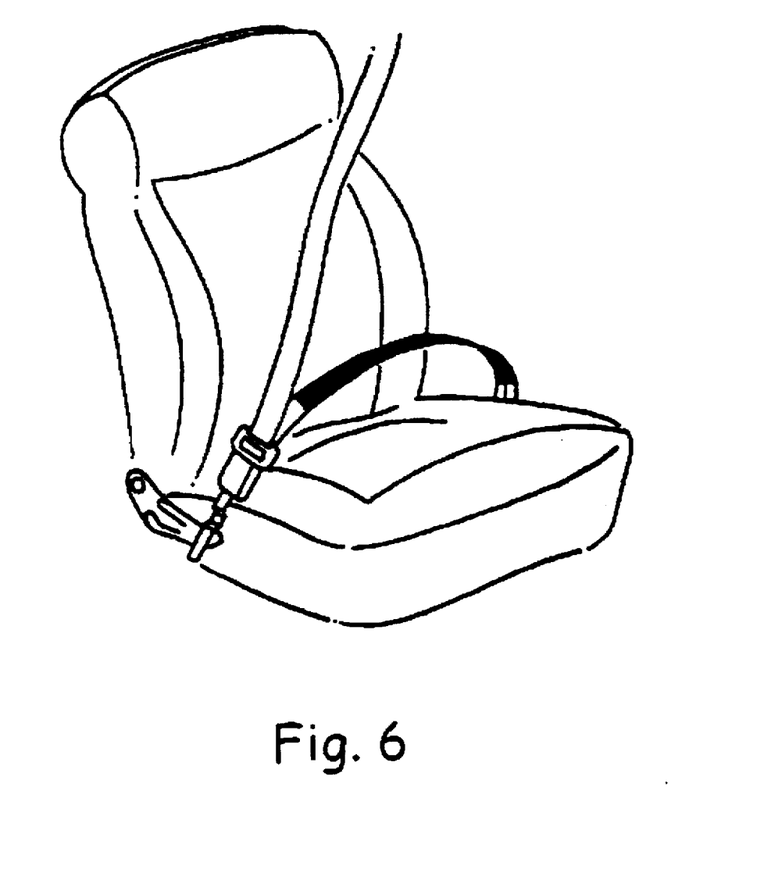
FIG. 6: a perspective view of an electrode arranged in such a way as to include the abdominal region in the capacity measurement.
Figure 7:
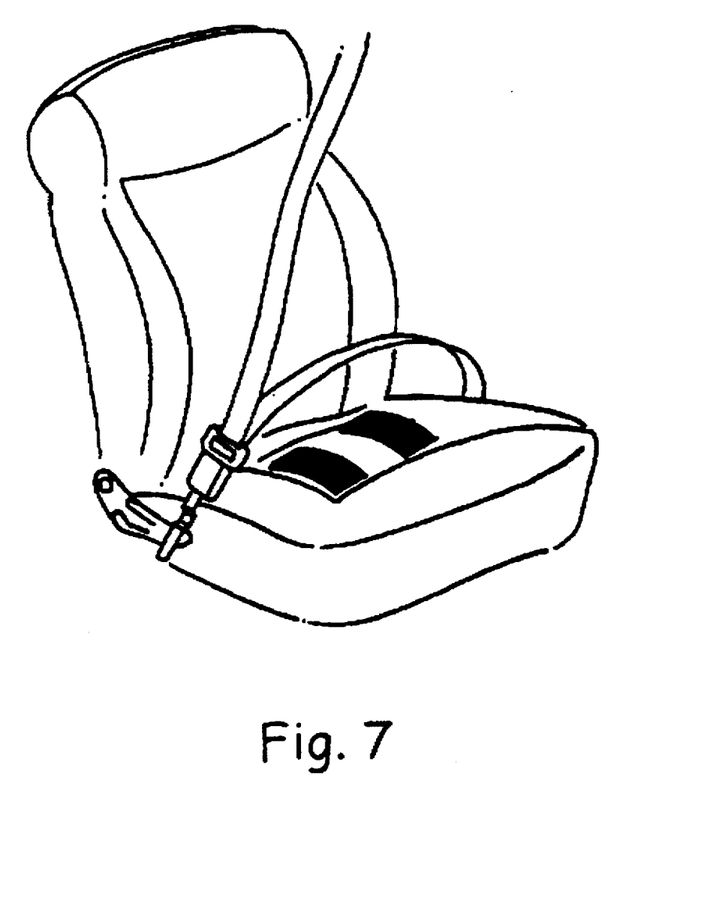
FIG. 7: a perspective view of two electrodes arranged in the seating surface.
Figure 8:
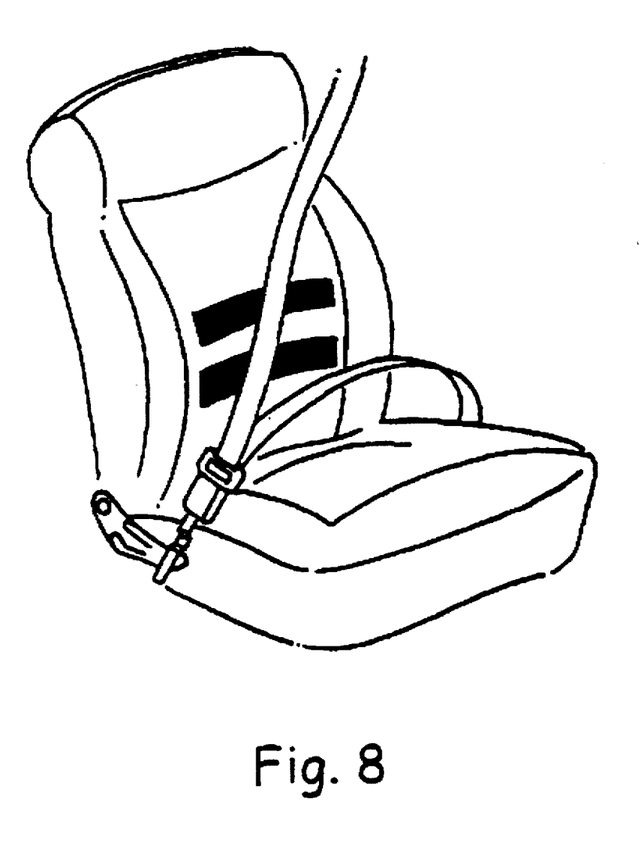
FIG. 8: a perspective view of two electrodes arranged a distance from each other in the seatback.
Figure 9:
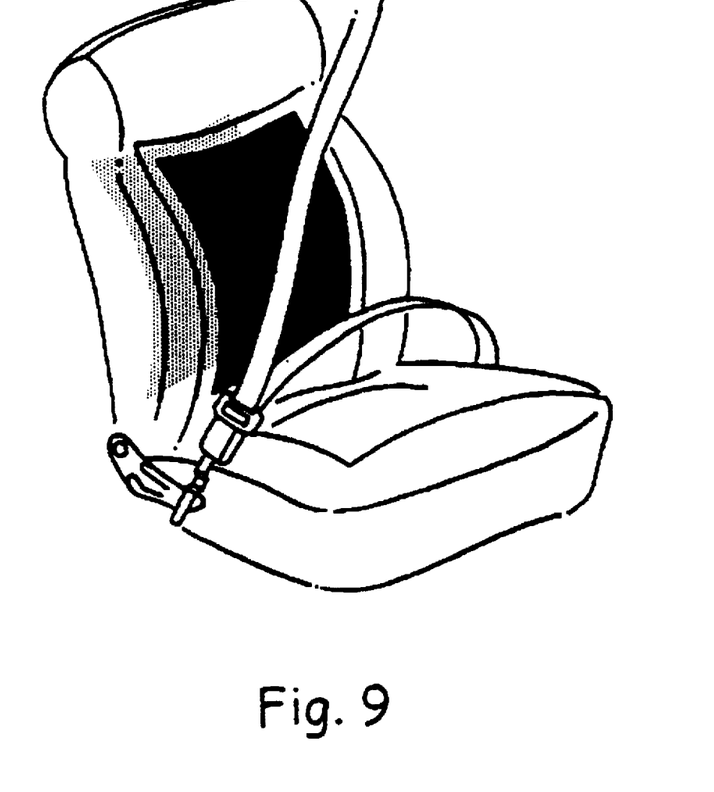
FIG. 9: a perspective view of two electrodes, the first electrode being arranged on the back of the seatback (dotted electrode) and a second electrode being arranged on the front of the seatback (black electrode).

FIG. 2 shows the first part of an evaluation circuit 16, which essentially consists of an oscillator 9 and a subsequent signal transducer 10.

A direct voltage is applied to the oscillator 9, via the voltage input 11, and the oscillator contained in it vibrates at a certain frequency, for example 4 MHz.

This frequency is passed to the signal transducer 10 through the coupling capacitor C3, forming part of the signal transducer, with an electrode 5, 6 being applied to each of the measurement inputs 12, 13, respectively.

The signal transducer essentially consists of a capacitative voltage divider (formed of C3 and the electrodes connected to terminals 12 and 13) with a subsequent rectifier (diode D2), which then forms a filter with C4 and R1. The output signal is then high-pass-filtered via the capacitor C5 and the resistor R2, which are wired in parallel, and then applied to the signal output 14, whereas 15 is the ground output.

At the outputs 14, 15, the signal is then processed further, for example passed to a computer in order to determine the breathing frequency and other breathing parameters without interference.

To eliminate the influence of artefact movement, it can be provided that in addition to the two measurement electrodes 5, 6, additional electrodes or other measurement sensors are also present, in order to be able to eliminate the influence of undesirable movement, which falsifies the measurement result between the electrodes 5, 6. In this connection, additional electrodes can be present in order, for example, to detect vibration of the body, an up-down acceleration of the body caused by an uneven road surface, and similar factors, and to include them in the evaluation.

The electrodes 5, 6 can be structured as flat electrodes, e.g. in the form of a foil. Likewise, the electrode can be formed by a wire.

KEY TO DRAWINGS 1 thorax
2 tissue
3 rib
4 spinal column
5 electrode
6 electrode
7 flux lines
8 cartilage
9 oscillator
10 signal transducer
11 voltage input
12 measurement input
13 measurement input
14 signal output
15 ground output
16 evaluation circuit

We claim:

1. A device for detecting the presence of persons in transport means including at least one seat where an electrical monitoring arrangement is assigned to at least one seat of the transport means, the electrical monitoring arrangement being adapted to measure the presence of a human body on the seat to which the electrical monitoring arrangement is assigned via a capacitive electrode arrangement that detects slight body changes over time, caused by breathing and/or heart beat.

2. The device pursuant to claim 1, characterized in that two electrodes are attached respectively to a safety belt and to a seatback of said seat, in a capacitive arrangement, forming a capacitor which is switched into an evaluation circuit by way of a plurality of measurement inputs.

3. The device pursuant to claim 2, characterized in that the safety belt is structured as an electrode and parts of or the whole safety belt, electrically connected with the evaluation circuit, are made to be electrically conductive.

4. The device pursuant to claim 2, characterized in that the evaluation circuit comprises:

an oscillator; and a signal transducer connected to an output of said oscillator;

said signal transducer including
i) a capacitive voltage divider, formed from a capacitor and the electrodes connected to the plurality of measurement inputs,
ii) a rectifier, and
iii) at least one filter.

5. The device pursuant to claim 1, characterized in that a metal frame of said seat is used as one of two electrodes.

6. The device pursuant to claim 1, characterized in that two electrodes are arranged respectively at a left and a right lumbar region on said seat, where the person's body is present as a dielectric in the field of said two electrodes.

7. The device pursuant to claim 1, characterized in that a capacity measurement of one of the upper body, the abdominal region, the lower body, and the thighs is made.

8. The device pursuant to claim 7, characterized in that the electrodes are arranged in a seating surface of said seat.

9. The device pursuant to claim 1, characterized in that two electrodes are arranged a predetermined distance from each other on a seatback of said seat.

10. The device pursuant to claim 1, characterized in that two electrodes are provided in a capacitive arrangement, which are stressed by pressure caused by the human upper body, where a first electrode is arranged on a back of a seatback of said seat, and a second electrode is arranged on a front of the seatback of said seat.

* * * * *